(12) United States Patent
Van Hoff et al.

(10) Patent No.: US 8,112,456 B1
(45) Date of Patent: Feb. 7, 2012

(54) IMPLICIT RANKING OF AUDIO CONTENT

(75) Inventors: Arthur Anthonie Van Hoff, Menlo Park, CA (US); Robert Ebert, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 546 days.

(21) Appl. No.: 11/697,634

(22) Filed: Apr. 6, 2007

Related U.S. Application Data

(60) Provisional application No. 60/790,244, filed on Apr. 7, 2006.

(51) Int. Cl.
 *G06F 7/00* (2006.01)
 *G06F 17/00* (2006.01)
(52) U.S. Cl. ......................................... 707/804; 707/694
(58) Field of Classification Search ........................ None
 See application file for complete search history.

(56) References Cited

U.S. PATENT DOCUMENTS

| | | | | |
|---|---|---|---|---|
| 7,532,217 | B2 * | 5/2009 | Marrin et al. | 345/473 |
| 7,840,620 | B2 * | 11/2010 | Vignoli et al. | 707/705 |
| 2004/0133569 | A1 * | 7/2004 | Munetsugu et al. | 707/3 |
| 2004/0237120 | A1 * | 11/2004 | Lewin et al. | 725/135 |
| 2005/0144636 | A1 * | 6/2005 | Hirai | 725/35 |
| 2006/0062363 | A1 * | 3/2006 | Albrett | 379/101.01 |
| 2006/0143236 | A1 * | 6/2006 | Wu | 707/104.1 |
| 2006/0155892 | A1 * | 7/2006 | Sudoh | 710/11 |
| 2006/0218187 | A1 * | 9/2006 | Plastina et al. | 707/104.1 |
| 2006/0253780 | A1 * | 11/2006 | Munetsugu et al. | 715/719 |
| 2006/0286951 | A1 * | 12/2006 | Nagamoto et al. | 455/186.1 |
| 2007/0016599 | A1 * | 1/2007 | Plastina et al. | 707/101 |
| 2007/0061497 | A1 * | 3/2007 | Takatsuka | 711/100 |
| 2008/0177994 | A1 * | 7/2008 | Mayer | 713/2 |
| 2009/0132453 | A1 * | 5/2009 | Hangartner et al. | 706/46 |
| 2010/0268680 | A1 * | 10/2010 | Hangartner et al. | 706/46 |

* cited by examiner

*Primary Examiner* — Pierre Vital
*Assistant Examiner* — Taelor Kim
(74) *Attorney, Agent, or Firm* — Workman Nydegger

(57) ABSTRACT

A media player device configured to store and play content for a user uses an implicit rank to add and delete content from the device. The rank is determined implicitly by gathering available information about a user directly and by monitoring user listening activity. The gathered information about the user and the monitored information are used to determine the user rank. Content is managed by comparing content stored on the media player device to the user rank to determine a preference order for storing content on the device; receiving content at the media player device; deleting one or more stored content objects from a computer readable storage medium so there is sufficient space to store the received content; and storing the received content on the computer readable storage medium.

5 Claims, 4 Drawing Sheets

IMPLICIT RANKING OF AUDIO CONTENT

CROSS-REFERENCE TO RELATED APPLICATIONS

This application claims the benefit of U.S. Provisional Patent Application Ser. No. 60/790,244 filed Apr. 7, 2006 and entitled IMPLICIT RANKING OF AUDIO CONTENT, which application is incorporated herein by reference in its entirety.

BACKGROUND OF THE INVENTION

1. The Field of the Invention

The present invention relates generally to the field of media player devices. More particularly, embodiments of the present invention relate to the creation of an implicitly determined user rank on a media player device that can predict content of interest as well as automatically add and delete content from the media player.

2. The Relevant Technology

Digital media comes in a variety of different formats and can be enjoyed on a wide variety of devices. Many of these devices, such as digital audio devices (e.g., MP3 players), CD players, DVD players, notebook computers, cellular telephones, and personal digital assistants, are portable devices with wireless capabilities. The growth in portable device technology corresponds with a growth in wireless network technology and the ability to distribute digital media. As a result, digital media can be received over wireless networks that include, for example, Internet Protocol (IP) based networks, radio networks, cellular networks, and Wireless Fidelity (WiFi) networks.

Digital media can also be received over satellite radio networks. Satellite Radio, or Satellite Digital Audio Radio Service (SDARS), is the broadcast of digital audio programming via satellites directly to users. Through satellite radio, subscribers can receive high quality, uninterrupted, digital data such as radio over more than one hundred channels. Digital quality music, talk radio, sports, news, and weather are examples of the content available over satellite radio. Often, in order to take advantage of the content offered over satellite radio networks, a user of satellite radio needs a portable device that can receive and ultimately play or perform the digital media content.

One of the goals the media content providers, such as satellite radio providers, want to achieve is enabling users to maximize their listening enjoyment. The more satisfied a user is with the technology and media the user uses, the more likely the user is to dedicate his or her time and entertainment dollars to that media. There are several tools that currently exist and that to help a user discover content they may enjoy. For example, users that purchase songs from a website can provide the website with certain preferences that help the website suggest songs that the user may want to purchase. When a user indicates that he or she prefers a certain genre, then artists included in that genre may be presented to the user. When a user identifies a particular artist, the website can present similar artists to the user. The website uses these preferences to minimize the searching that the user performs as well as to encourage the sale of the new content. Using user preferences to suggest songs is often successful because users are more likely to purchase content if they have some assurance that it is similar to content with which they are familiar.

While websites can attempt to identify content of interest for a user, the user preference is ultimately a personal decision that is not constrained by artificial categories. In addition, users do not have unlimited storage capacity on their media player devices in which they can store content of lesser interest. As users obtain more and more content, whether from recorded satellite radio, purchased on-line content, or another source, systems and methods are needed to help users identify content of greater interest and store such content on their media player devices in preference to content of lesser interest.

BRIEF SUMMARY OF THE INVENTION

These and other limitations are overcome by embodiments of the present invention, which relate to systems and methods for determining an implicit user rank to which content can be compared and then either adding or deleting the content from a media player device. The present invention enables a radio device having a computer readable storage medium to identify music of likely interest to a user and automatically modify the content stored on the device using the user rank. The rank is generally determined based on a user's listening patterns, listening history, and other gleaned information about or from the user.

Accordingly, a first example embodiment of the invention is a media player device configured to store and play content for a user. The device generally includes: a media receiver operable to receive selected media; a computer readable storage medium configured for storing media received at the media receiver; an implicit rank generation module operable to generate a user ranking indicative of a user's media preferences, whereby media can be added and removed from the computer readable storage medium based on the implicit rank; and a media player for playing media stored on the computer readable storage medium to a user.

Another example embodiment of the invention is a method, in a media player device that delivers media content to a user, for determining an implicit rank to manage content storage on the media player device. The method generally includes: gathering available information about a user including factors selected from user input information and information stored on devices in communication with the media player device; monitoring user listening activity to obtain monitored information; and using the gathered information about the user and the monitored information, determine a user rank that indicates user listening preferences that can be used to manage content storage on the media player device.

Yet another example embodiment of the invention is a method, in a media player device that delivers media content to a user, for managing content storage on the media player device. The method generally includes: comparing content stored on a media player device to a user rank to determine a preference order for storing content on the device; receiving content at the media player device; if the computer readable storage medium does not have sufficient remaining storage capacity to store the received content, deleting one or more stored content objects from the computer readable storage medium so that there is sufficient space to store the received content; and storing the received content on the computer readable storage medium.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Reference will now be made to the Figures wherein like structures will be provided with like reference designations. It is understood that the drawings are diagrammatic and schematic representations of presently preferred embodiments of the invention, and are not limiting of the present invention nor are they necessarily drawn to scale.

In the following description, numerous specific details are set forth in order to provide a thorough understanding of the present invention. It will be obvious, however, to one skilled in the art that the present invention may be practiced without these specific details. In other instances, well-known aspects of media player and computing devices have not been described in particular detail in order to avoid unnecessarily obscuring the present invention.

The present invention enables a device having a computer readable storage medium to identify music of likely interest to a user and automatically modify the audio content stored on the device. This is accomplished by determining an implicit rank for the user that indicates or embodies the user's listening preferences. The rank is generally determined based on a user's listening patterns, listening history, and/or other gleaned information about or from the user.

Figure 1:
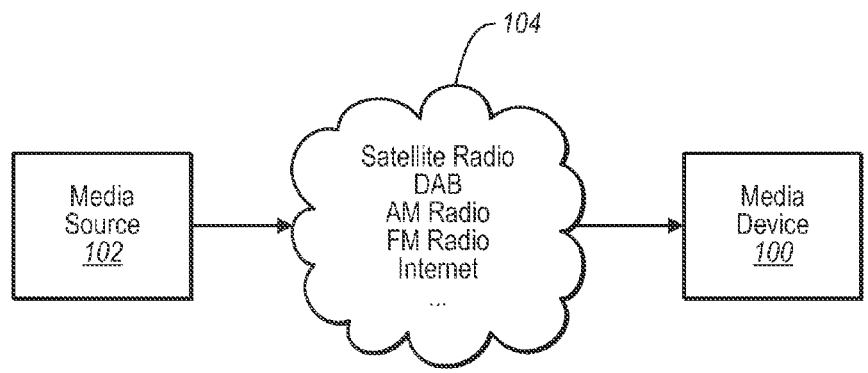
FIG. 1 illustrates an example environment for implementing embodiments of the invention to add content to a media player device.

FIG. 1 depicts an example environment for implementing embodiments of the invention and depicts a media device 100 that can receive content including digital media from one or more sources. In this example, the device 100 is representative of both portable and non-portable devices that can receive content that may include digital audio and/or digital video data. In the event the device 100 receives non digital data, device 100 preferably includes analog to digital converters. Examples of the device 100 include, by way of example, a satellite radio device, a portable audio player (e.g., an MP3 player), a portable video player, a personal computer, a laptop computer, a cellular telephone, a personal digital assistant, and the like or any combination thereof.

The invention is generally practiced as a media signal is broadcast from a media source 102 to a media device 100 via a network medium 104. The medium 104 is a system whereby media is transmitted to the media device 100. By way of example, the medium 104 can be satellite radio. Generally, satellite radio is the broadcast of digital audio programming from a broadcast station to satellites and from the satellites directly to the interactive radio devices that are represented by the media device 100. Through satellite radio, subscribers can receive high quality, uninterrupted, digital data such as radio over multiple radio channels. The digital data may include, for example, digital quality music, talk radio, sports, news, weather, and the like.

In addition, the transmission of media content to users can come through various other conventional or future broadcast mediums. For example, FM (frequency modulation) and AM (amplitude modulation) radio are the most traditional methods for providing audio content unidirectionally to a widespread audience. Another example is DAB (Digital Audio Broadcasting), also known as digital radio or high-definition radio. DAB is a growing broadcast media in which analog audio is converted into a digital signal and transmitted on an assigned channel in the AM or (more usually) FM frequency range. DAB offers higher quality audio on the FM broadcast band than analog radio transmissions. In addition, Internet radio, podcast technology, or other forms of Web based audio can also be used with various aspects of the invention to enable widespread media communication to users. For example, one of skill in the art can appreciate that embodiments of the invention can be applied to other networks (wired and/or wireless) over which content is delivered. Cellular networks, IP based networks, WiFi networks, Bluetooth networks, and the like or any combination thereof are examples of networks over which the transmission of content can occur.

Other forms of media such as video and photos can also preferably be transmitted to the media device 100 and stored thereon according to embodiments of the invention.

Embodiments of the invention enable a ranking system on media device 100 to filter the new content that is being received to identify specific content or certain channels or data streams that may be of interest to the user or that may not be of interest to the user. Media device can then automatically store the content of interest on the device. Further, the content can be purchased with little or no overhead required of the user as described in co-pending U.S. patent application Ser. No. 11/193,980, filed Jul. 29, 2005 and entitled "Automated Acquisition of Discovered Content," which is hereby incorporated by reference. Embodiments of the invention can apply to situations where the user acquires permanent rights to the content as well as to situations where the user rents or temporarily accesses the content.

The invention may include systems and methods by which feedback data can be sent from the media device 100 back to the media source 102 or another data gathering source. Such feedback allows the broadcast station or another data collector to obtain data regarding the user's listening preferences and implicit ranking. Further details regarding the use of backchannels can be found in U.S. Provisional Patent Application No. 60/790,389, filed Apr. 7, 2006, entitled "Radio With Backchannel Feedback," which application is incorporated herein by reference.

Figure 2:
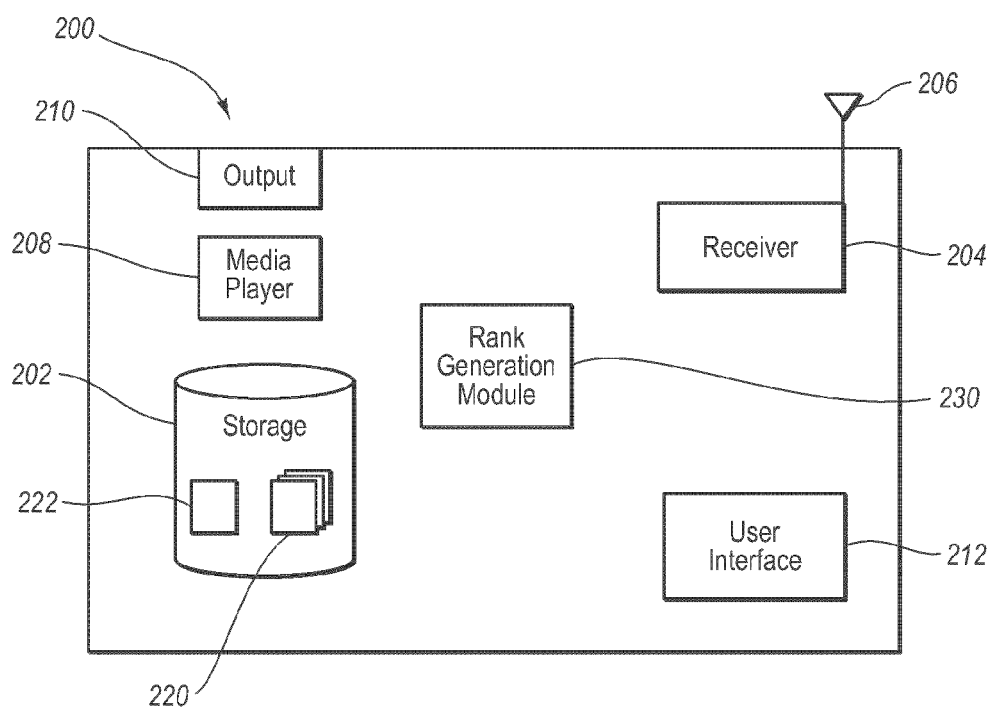
FIG. 2 illustrates one embodiment of a device that can determine a user rank and add or delete content from a device based on the rank.

FIG. 2 illustrates greater details of an example media device 200, which is one embodiment of the device 100 in FIG. 1, in accordance with the present invention. The device 200 is representative of both portable and non-portable devices that can receive, store, and/or play digital content as previously described with reference to FIG. 1.

The media device 200 generally includes a media receiver 204 with the necessary components. By way of non-limiting example, the media receiver 204 may include an antenna 206, configured to receive media, such as a wireless audio broadcast. The details of such components, for example those necessary to operate a satellite radio device, will be apparent to one skilled in the art in view of the disclosure herein and are not depicted to avoid unnecessarily obscuring the invention. In some embodiments of the invention, the receiver 204 is also configured to receive other data that is integrated with or accompanies the audio stream. Depending on the details of the system, the receiver 204 can be a satellite radio receiver, an FM or AM radio receiver, a DAB receiver, and the like. The device can also have more than one receiver to obtain a variety of radio signals. Accordingly, while antenna 206 is depicted as a single antenna, those skilled in the art will recognize that multiple antennas may be used for each distinct type of radio signal.

Embodiments of the invention relate to other types of devices in addition to wireless audio receivers. As illustrated in FIG. 1, the device 100 can receive content from a content source 102 over other sources such as for example an IP network, wired or wireless communication shared from nearby media devices, and a computing device having media stored thereon. By way of example, Bluetooth networks, WiFi networks, cellular networks, and other wireless networks may be accessible to the device 200. The device 200 may also have access to the Internet or a LAN when docked with a computer or using a wireless connection. For example, the device 200 may have the capability to access other content providers or servers over the network 104. Regardless, the content transmitted to the device 200 is received by receiver 204, which can include both wireless and wired hardware, to receive media content in any method known to those of skill in the art.

Those skilled in the art will appreciate that various of the foregoing features of the invention may be practiced alone or in network environments with many types of computer system configurations, including media players, satellite radio receivers, FM transmitters or receivers, DAB transmitters or receivers, personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

The media device includes the necessary hardware and software to operate as a media player device as indicated by media player module 208. The media player module 208 accesses computer readable storage medium 202 or receiver 204 to obtain the necessary media to play for a user. As such, the device also includes a media output 210, for example one or more of a wired or wireless headphone jack, a speaker, or a display for communication.

The media device 200 in FIG. 2 includes a computer readable storage medium 202, such as for example a magnetic hard drive or flash memory, for storing media content 220 on the media device 200. The computer readable storage medium 202 can be volatile and/or non-volatile and include one or more pieces of hardware. The computer readable storage medium 202 may also include remote data storage that is accessible to but not on the media device 200. The computer readable storage medium 202 of the device is used to store content or other user and/or device data. The computer readable storage medium 202 can also be used to record content that is received from the content providers or obtained from another source. The computer readable storage medium 202 may store digital music and/or video, graphics, playlists, user preferences, device settings, and the like or any combination thereof. The computer readable storage medium 202 can thus store operational data related to the operation of the device including an operating system, the operational modules described herein, user rank information, and user preferences in addition to storing media content.

The content 220 represents different types of media or data streams including digital media that may be received by the device 200. Examples of the content 220 include, but are not limited to, digital music, talk audio data, television data, movie data, podcasts, sports data, and the like or any combination thereof. The content 220 can be either digital or analog in nature. While content received over receiver 204 can be accessed in real time, the content 220 is not temporally limited because it can be examined and/or accessed at any time by the device 200. Each piece of content preferably has metadata associated therewith so that information such as author, genre, etc. can be used to determine whether media is stored and played based on the user's rank. This is not always required, however, since information such as play frequency and play patterns can be added by the device 200 while the content is on the device.

The device 200 also includes a user interface 212 or other means of providing input to the device 200. Such user input mechanisms are not limited by the invention and can include a touch pad, a switch, buttons, a joystick, a mouse, a keyboard, voice control, or any other current or future developed user input mechanisms. The user interface 212, by way of example, enables a user to navigate and perform the digital media that is stored on the computer readable storage medium 202 of the device 200 or to navigate and perform any content or data stream that is received from an external source. The user interface 212 may also enable a user to switch to another channel such as in satellite radio. The user interface also allows a user to input direct preferences to override the implicit rank module 214 so that preferred content is preserved on the device and less preferred or unwanted content is removed. The user interface 212 can also be used to coordinate the purchase of content.

According to embodiments of the invention, an implicit user ranking/characterization may be determined by monitoring a user's listening behavior. Information used to determine rankings may include whatever information can be obtained. For example, the frequency with which a song or other media content is played, changes to playlists, changes to purchased content, changes to uploaded content, amount of time spent on channels, changes to volume levels while playing a song or other media content, the time at which content is played or skipped, the time position of content at which play is terminated, song skipping early in a song, album, genre, artist, whether the song is new, and the like or any combination thereof are examples of information that may be monitored. The ranking generated by the rank generation module 230 can be used to automatically eliminate content from a user's media device and/or add content to the user's media device. The recording can be done in real time or faster than real time. It should be noted that while any of the items taken individually might indicate preference or lack thereof, the model may be refined over time. For example, song skipping early in a song that occurs at an hour break might be indicative of the user tuning to a regularly scheduled program rather than a lack of interest in the content.

Figure 3:
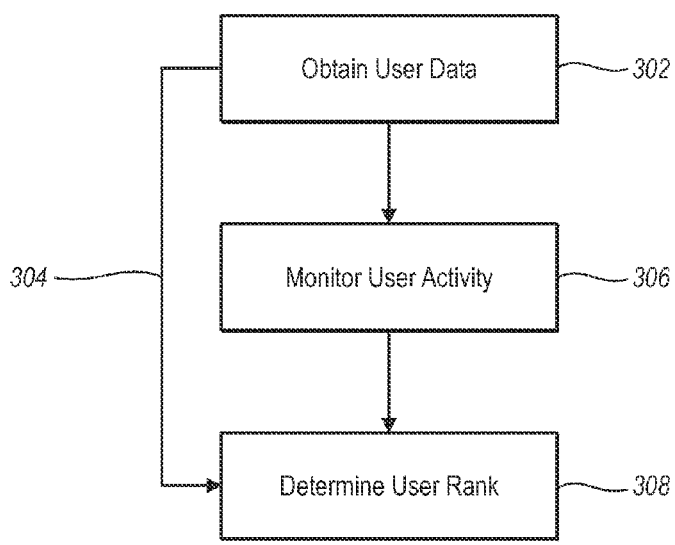
FIG. 3 illustrates, in block form, a preferred method for determining a user rank.

FIG. 3 illustrates in general block format how a rank is determined. Generally, information about a user (or about more than one user if a device is shared) or the history of the device 200 is determined from whatever information can be obtained by the rank module 230, as indicated by block 302. Such information can include, by way of example only, user input preference information, user loaded media, playlists, user age and other demographic information, and may also include other types of information discussed herein and the like or any combination thereof. Another source of information used in the rank module 230 can be obtained from other devices. In other words, community information can be used in or by the rank module 230. The user and community information can be used to determine a rank as indicated at block 308 via path 304. This information can be continually updated.

However, it is preferred that the rank over time is also adjusted by monitoring the user's activities, as indicated by block 306. Such information may include content that has been recorded on the device 200, information regarding content that has been purchased or accessed from a remote server, metadata regarding content played or stored by the device, information regarding content currently stored on the device or on a computer that the device can connect with, metadata associated with songs or content actually performed by the device, and the like or any combination thereof.

As an example of the analysis that can be performed, the rank module 230 can compare the times that users change the content played, for example by comparing radio stations to the content broadcast on the stations at those times. The rank module 230 could then determine useful information such as when users tune in to traffic or news on a given station and what songs trigger a given listener to change the station. By analyzing patterns, more advanced analysis systems can break down the information to distinguish between channel changes influenced by content from channel changes influenced by a predetermined desire to review scheduled content on another station. For example, it has been determined there is a higher likelihood that a channel change in the first fifteen seconds of a song is a strong indicator that the song is disliked by a given listener. Other examples of information that can be obtained include shifts in volume, time of day media is played at, detailed review of the frequency that content is played at and in what combinations, and any other query an administrator can determine that suggests content that is of greater or lesser interest to a user.

In another example, various embodiments of the invention go beyond monitoring listener habits or activities to include emotional or intellectual aspects of a listener's experience by receiving the listener's direct feedback on content as the content is experienced by the user. This feedback can therefore come in the form of direct user responses as they experience content. Monitoring 304 the user activity can then be used to determine or to adjust a user rank for content stored on the device or for content being received by the device.

Figure 4:
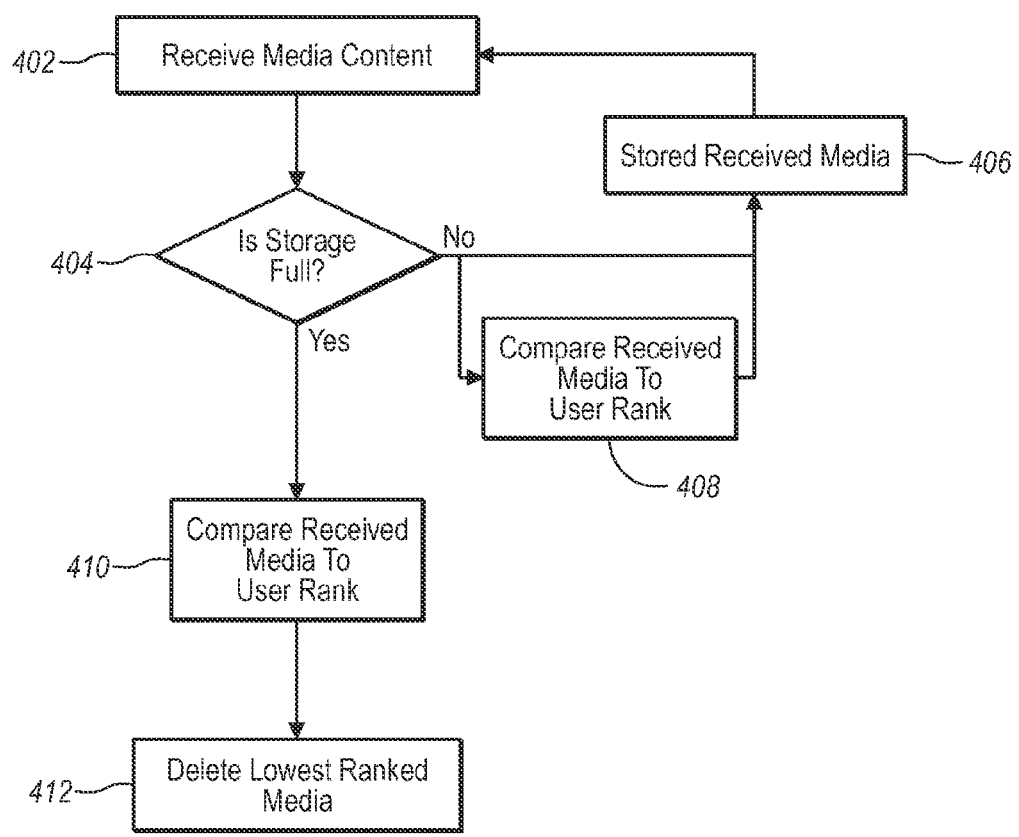
FIG. 4 illustrates, in block form, a preferred method for adding or deleting content from a device based on the user rank.

FIG. 4 illustrates another example method of the invention through which content is added and/or removed from the device 200. As illustrated in block 402, content is routinely received by device 200 at receiver 204. In a preferred embodiment of the invention the method then queries whether the portion of the computer readable storage medium 202 that is dedicated to storing content is full, as indicated by data block 404. The determination of whether the storage is full can be adjusted to determine how much memory is unused. A user, for example, may desire to keep a certain percentage or amount of memory free. Thus, the determination at block 404 may be determining if the memory is within threshold. If not, then the received content can be added to the computer readable storage medium 202, as indicated at block 406. In addition, the system of the invention can be configured so that the query as to whether content is stored is dependent not only upon space on the computer readable storage medium 202, but also upon the relative value of the content when compared to rank 222, as indicated by block 408. In one embodiment, the received media content is given a rank by the rank module as it is recorded or stored on the device.

If it is determined that the computer readable storage medium 202 does not have room to store the received content but that it may be desirable to store the content, the content is compared to rank 222, as indicated by block 410, as is the other content stored on the computer readable storage medium 202. The comparison of the received media content to the user rank may include ranking the received media content. For example, information about the received media content (how new is the content, album, artist, and other information known about the song) can be used to generate a rank. Based on this decision, the system then determines to perform one or more of adding the new content to the computer readable storage medium 202 and deleting the lowest ranked content from the computer readable storage medium 202 to make space for the new content, as indicated by block 412. Of course, the decision to delete low ranked content can be made at any time. Additionally, the system may determine not to store the received media content.

In another embodiment, the user may also be presented with content that is appropriate to the user rank. A service or the media repository can thereby include suggestions for additional content to the user to purchase or sample. Over time, the service and/or the media repository can refine the recommendations or suggestions provided to the user as the user selects additional content. Similar to the automated acquisition of the content, the suggestions or recommendations provided to the user can also be generated and delivered with minimal user input. For example, when the selected content is delivered to the user's device, the metadata displayed to the user can include the recommendations of a content service or listener community.

Embodiments of the media device may include computer-readable media for carrying or having computer-executable instructions or data structures stored thereon. Such computer-readable media can be any available media that can be accessed by a portable device or general purpose or special purpose computer. By way of example, and not limitation, such computer-readable media can comprise Random Access Memory (RAM), Read Only Memory (ROM), Electrically Erasable Programmable Read Only Memory (EEPROM), Compact Disk Read Only Memory (CD-ROM) or other optical disk storage, magnetic disk storage or other magnetic storage devices, or any other medium, including solid state storage, which can be used to carry or store desired program code means in the form of computer-executable instructions or data structures and which can be accessed by a portable device or general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although not required, the invention may be described in the general context of computer-executable instructions, such as program modules, being executed by computers in network environments. Generally, program modules include acts, routines, programs, objects, components, data structures, etc., that perform particular tasks or implement particular abstract data types. Computer-executable instructions, associated data structures, and program modules represent examples of the program code means for executing acts of the methods disclosed herein. The particular sequence of such executable instructions or associated data structures represents examples of corresponding acts for implementing the functions described in such acts.

The devices may also include a magnetic hard disk drive for reading from and writing to a magnetic hard disk, a magnetic disk drive for reading from or writing to a removable magnetic disk, or an optical disk drive for reading from or writing to removable optical disk such as a CD-ROM or other optical media. The drives and their associated computer-readable media provide nonvolatile storage of computer-executable instructions, data structures, program modules and other data. Although the example environment described herein may employ a magnetic hard disk, a removable magnetic disk and/or a removable optical disk, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk, magnetic disk, optical disk, ROM or RAM, including an operating system, one or more application programs, other program modules, and program data. A user may enter commands and information through a keyboard, pointing device, or other input devices (not shown), such as a microphone, joy stick, touch pad, game pad, satellite dish, scanner, or the like. These and other input devices are often connected to the processing unit through a universal serial bus (USB) or serial port interface coupled to system bus. Alternatively, the input devices may be connected by other interfaces, such as a parallel port, or a game port. A display device is also connected to system bus via an interface, such as video adapter.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A media player device operable to store and play content for a user, the device comprising:
    a media receiver operable to receive media content;
    a computer readable storage medium configured for storing items of media content received at the media receiver;
    an implicit rank generation module operable to automatically generate an implicit ranking for each item of media content indicative of a user's listening preferences,
    wherein the implicit rank generation module is operable to generate the implicit ranking for each item of media content based on user information, metadata associated with the media content experienced by the user, and user listening history,
    the implicit generation module further operable to automatically adjust the implicit ranking for each item of media content over a period of time, the automatic adjustment based on analyzing patterns of each item of media content, the patterns being indicative of and based on the user's listening preferences,
    wherein the patterns include a number of times a user has manually skipped a particular item of media content while the particular item of media content is being played except when the skip occurs at an hour break in which case the skip is not added to the number of times the user has manually skipped the particular item of media content,
    wherein the number of times a user has manually skipped the particular item of media content does not include a skip to a radio station that is broadcasting news or traffic at the time of the skip, and
    wherein the media player device is configured to: determine that the computer readable storage medium of the media player device lacks sufficient storage space for an additional item of media content;
    compare the implicit ranking of a first item of media content stored on the computer readable storage medium of the media player device with an implicit ranking of the additional item of media content;
    determine that the implicit ranking of the first item of media content stored on the computer readable storage medium of the media player device is less than the implicit ranking of the additional item of media content; and
    based on the determination that the computer readable storage medium of the media player device lacks sufficient storage space for the additional item of media content and the determination that the implicit ranking of the first item of media content stored on the computer readable storage medium of the media player device is less than the implicit ranking of the additional item of media content from the computer readable storage medium of the media player device and automatically add the additional item of media content to the computer readable storage medium of the media player device; and
    a media player for playing media content stored on the computer readable storage medium to the user.

2. A device as defined in claim 1, wherein the media receiver comprises one or more of: a satellite radio receiver, a DAB receiver, an FM receiver, an AM receiver, a Web based audio receiver, and a networked connection for receiving media content from a network or a linked computing device.

3. A device as defined in claim 1, further comprising a user input mechanism whereby a user can designate controls regarding the storage of media content on the computer readable storage medium.

4. A device as defined in claim 1, wherein the computer readable storage medium comprises one or more of: magnetic disk storage, optical disk storage, and solid state storage.

5. A device as defined in claim 1, wherein the patterns includes one or more of: the frequency a selected content object is played; changes to playlists; changes to purchased content; changes to uploaded content; time at which content is played or skipped; the time position of content at which play is terminated; or changes to the volume while playing a content object.

* * * * *